United States Patent
Allen et al.

(10) Patent No.: US 11,535,539 B2
(45) Date of Patent: Dec. 27, 2022

(54) METHOD FOR TREATING WASTEWATER AND WASTEWATER SLUDGE USING A PERCARBOXYLIC ACID

(71) Applicant: Kemira Oyj, Helsinki (FI)

(72) Inventors: James Currie Allen, Brantford (CA); Tafadzwa Mariga, Arlington, TX (US)

(73) Assignee: Kemira Oyj, Helsinki (FI)

( * ) Notice: Subject to any disclaimer, the term of this patent is extended or adjusted under 35 U.S.C. 154(b) by 3 days.

(21) Appl. No.: 16/344,856

(22) PCT Filed: Nov. 17, 2017

(86) PCT No.: PCT/FI2017/050791
§ 371 (c)(1),
(2) Date: Apr. 25, 2019

(87) PCT Pub. No.: WO2018/091784
PCT Pub. Date: May 24, 2018

(65) Prior Publication Data
US 2020/0048118 A1   Feb. 13, 2020

Related U.S. Application Data

(60) Provisional application No. 62/423,870, filed on Nov. 18, 2016.

(51) Int. Cl.
| C02F 1/72 | (2006.01) |
| C02F 1/00 | (2006.01) |
| C02F 11/06 | (2006.01) |
| C02F 101/10 | (2006.01) |
| C02F 103/34 | (2006.01) |

(52) U.S. Cl.
CPC .............. *C02F 1/722* (2013.01); *C02F 1/008* (2013.01); *C02F 11/06* (2013.01); *C02F 2101/101* (2013.01); *C02F 2103/34* (2013.01); *C02F 2209/26* (2013.01); *C02F 2303/02* (2013.01)

(58) Field of Classification Search
CPC .. C02F 1/72; C02F 1/722; C02F 1/008; C02F 1/00; C02F 11/00; C02F 11/06; C02F 2303/02; C02F 2303/08; C02F 2101/101; C02F 2103/34; C02F 2209/26
USPC ......................................................... 210/739
See application file for complete search history.

(56) References Cited

U.S. PATENT DOCUMENTS

| 4,595,577 A * | 6/1986 | Stas ........................ C02F 1/722 |
| | | 423/245.2 |
| 2005/0072743 A1 | 4/2005 | Schneider et al. |

FOREIGN PATENT DOCUMENTS

| JP | 3712018 B2 | 11/2005 | |
| WO | 2013113998 A1 | 8/2013 | |
| WO | 2013175062 A1 | 11/2013 | |
| WO | 2014182561 A1 | 11/2014 | |
| WO | WO-2014182561 A1 * | 11/2014 | ................. C02F 1/50 |
| WO | 2016100700 A1 | 6/2016 | |
| WO | WO-2016100700 A1 * | 6/2016 | ............. C23F 11/149 |

OTHER PUBLICATIONS

WO 2014182561 A1, Nov. 2014, Ryther Robert.*
WO 2016100700 A1, Jun. 2016, Brewster Allison.*

* cited by examiner

*Primary Examiner* — Akash K Varma
(74) *Attorney, Agent, or Firm* — Meunier Carlin & Curfman LLC

(57) ABSTRACT

A method for treating a wastewater or a wastewater sludge includes adding performic acid to the wastewater and/or the waster sludge as an odor controlling agent and/or corrosion controlling agent.

9 Claims, No Drawings

METHOD FOR TREATING WASTEWATER AND WASTEWATER SLUDGE USING A PERCARBOXYLIC ACID

PRIORITY

This application is a U.S. national application of the international application number PCT/FI2017/050791 filed on Nov. 17, 2017 and claiming priority of provisional application 62/423,870 filed on Nov. 18, 2016 the contents of all of which are incorporated herein by reference.

FIELD OF THE INVENTION

The present invention relates to a method for treating wastewater and/or wastewater sludge according to the independent claim presented below. The invention relates also to use of percarboxylic acid in odor control and/or in corrosion control.

BACKGROUND OF THE INVENTION

Various organic and inorganic compounds can cause problems in wastewater treatment processes, one of the most remarkable of which is bad odor. Hydrogen sulfide is often identified as the predominant odor- and corrosion-causing compound of concern in wastewater treatment systems. Hydrogen sulfide $H_2S$, is naturally generated, when organic matters in the wastewater treatment process are degraded through anaerobic digestion by bacteria. In typical domestic wastewater, microbial reduction of the sulfate ion is the dominant mechanism for sulfide formation.

Bacteria in wastewater treatment system may respire soluble oxygen, soluble nitrate, or soluble sulfate as sources for terminal electron acceptors to generate energy depending on the type of environment they live in. Soluble oxygen is usually present in fresh wastewater, but is rapidly depleted by biological activity. There is typically very little nitrate present in wastewater, while sulfate is typically abundant. Since little or no nitrate is available, in the absence of soluble oxygen and in the presence of soluble biological oxygen demand, the bacteria begin respiring sulfate to generate energy. To obtain energy, the bacteria must transfer the electron from the electron donor to sulfate, effectively reducing the sulfate to sulfide. The dissolved sulfide combines with hydrogen ions to form hydrogen sulfide, causing odor problems. The rate of sulfide production is dependent upon the concentrations of sulfate ions, organic matter, as well as other factors such as pH, temperature, retention time and stream velocity. Sulfides exist in wastewater in three forms: $H_2S$ gas, non-volatile bisulfate $HS^-$ and sulfide $S^{2-}$.

Hydrogen sulfide is a dense, colorless and strongly odorous gas. It is naturally converted to sulfuric acid by certain bacteria in aerobic conditions. Sulfuric acid is corrosive towards steel and concrete used in the equipment of the wastewater or wastewater sludge collection and treatment systems. Thus, dissolved sulfides in wastewater may also cause corrosion problems.

The amount of hydrogen sulfide may be controlled by preventing sulfide formation or removing sulfide after it has formed by precipitation and/or oxidation. Liquid phase control is a method of odor and corrosion prevention, by which chemicals are introduced into the wastewater to react with dissolved sulfides effectively oxidizing them, thereby preventing the release of $H_2S$ into the vapor phase. Liquid phase treatment of wastewater to remove soluble/dissolved sulfides usually involves adding significant quantities of chemicals, several classes of chemicals are used. One of the commonly used methods is chemical oxidation of sulfides to sulfate or sulfur by chlorine, chlorine-based chemicals or hydrogen peroxide ($H_2O_2$). However, the reaction between hydrogen peroxide and sulfide is relative slow and thus adequate mixing and contact time must be provided in the wastewater treatment. Further to this, hydrogen peroxide is very reactive, and it is very difficult to maintain a residual through the system to maintain an effective odor control system. Also, other chemicals used in liquid phase treatment of wastewaters may have side-effects on the downstream treatment plant and receiving waters. For example, chlorine used to oxidize sulfide may have a residual disinfectant effect on activated sludge processes, and iron salts may increase in sludge production.

Although a number of sulfide control strategies are available, no preferable technology is identified. There is still need for an efficient and preferably environmentally friendly method for controlling odors in wastewater treatment processes.

SUMMARY OF THE INVENTION

It is an object of the present invention to reduce or even eliminate the disadvantages existing in prior art.

It is an object of the present invention to provide a novel method for treating wastewater and/or wastewater sludge for preventing bad odors. Especially, it is an object of the present invention to provide a method for controlling dissolved sulfide levels in wastewater. It is also an object of the invention to provide an effective and more economical and environmentally friendly alternative to the applications using chemical oxidants.

In order to achieve among others, the objects presented above, the invention is characterized by what is presented in the enclosed independent claims.

Some preferred embodiments of the invention will be described in the other claims.

The embodiments and advantages mentioned in this text relate, where applicable, both to the method as well as to the uses according to the invention, even though it is not always specifically mentioned.

Typical method according to the present invention for treating wastewater or wastewater sludge uses a treating chemical comprising percarboxylic acid as an odor controlling agent and/or a corrosion controlling agent. Typically, the method according to the invention for treating of wastewater or wastewater sludge comprises obtaining a wastewater or wastewater sludge stream, and adding a treating chemical comprising percarboxylic acid to the wastewater or wastewater sludge stream.

In typical method according to the invention a level of dissolved sulfides is controlled by adding a treating chemical comprising percarboxylic acid to the wastewater or wastewater sludge stream, wherein an amount of the dissolved sulfides is reduced in wastewater or wastewater sludge stream. This may be observed by reduced odor and corrosion problems. In the present application dissolved sulfides means also soluble sulfides which are capable of dissolve into wastewater or wastewater sludge. The present invention is concerned to affect a level of dissolved sulfides and/or soluble sulfides.

Typically, the percarboxylic acid is selected from the group consisting of performic acid (PFA), peracetic acid and a combination of thereof. Thus, the invention relates also to the use of the percarboxylic acid, preferably performic acid, peracetic acid or a combination thereof, in odor control of the wastewater and/or wastewater sludge. In addition, the invention relates the use of the percarboxylic acid, preferably performic acid, peracetic acid or a combination thereof, as a corrosion control in wastewater or wastewater sludge collection and treatment processes. In one preferred embodiment, performic acid (PFA) is used as a treating chemical comprising for odor and/or corrosion controlling.

It has been surprisingly found that a treating chemical comprising percarboxylic acid may effectively oxidize dissolved sulfides to sulfate in wastewater and/or wastewater sludge, and preventing the formation of $H_2S$ under favorable conditions that is mal-odorous and corrosion causing, whereas the sulfate remains in wastewater or wastewater sludge. Thus, the odor and corrosion can be remarkably decreased. A treating chemical according to the invention comprising percarboxylic acid, such as performic acid, reduces a concentration of gaseous sulfides in air above the wastewater by significantly reducing the dissolved sulfide in the wastewater that can volatilize into the air, and thus eliminating bad odors.

The method according to the invention is based on liquid phase control method for odor and corrosion prevention, by which a treating chemical is introduced into the wastewater and/or wastewater sludge to react with dissolved sulfides, thereby preventing the release of $H_2S$ into the vapor phase. The present invention is based on liquid-phase $H_2S$ control method by using a treating chemical comprising percarboxylic acid. The percarboxylic acid may be performic acid, peracetic acid or a combination of thereof.

According to a preferred embodiment of the invention, a treating chemical comprising performic acid is used as an odor controlling agent and/or corrosion controlling agent. Performic acid ($CH_2O_3$) is a reaction product of formic acid and hydrogen peroxide. It is fully biodegradable since it degrades to water and carbon dioxide. Thus, a treating chemical comprising performic acid is environmentally friendly. Ultimately, its use as odor controlling agent and/or corrosion controlling agent is advantageous, as it does not harm the environment. Performic acid also has strong oxidizing properties, and thus, small dosing amount of PFA as active concentration may achieve significant reduction of dissolved sulfides.

It has been also observed that the addition of percarboxylic acid, such as performic acid, effectively prevents, or at least decreases, corrosion of process surfaces in wastewater or sludge treatment and collection systems.

In a preferred embodiment of the invention, performic acid is used as the treating chemical. The performic acid generated to be added to wastewater and/or wastewater sludge may have an active concentration at least 8%, preferably at least 9% or preferably at least 10%, calculated as weight to volume. In an embodiment of the invention, the performic acid generated to be added to wastewater and/or wastewater sludge may have an active concentration in the range of 8-14% or 10-14%, calculated as weight to volume. According to one typical embodiment of the invention, the performic acid generated to treat the wastewater and/or wastewater sludge may have an active concentration around 13.5%, calculated as weight to volume. In some embodiments, an active concentration of performic acid may be about 9% or 9.5%, calculated as weight to volume. Above mentioned active concentrations are preferred used concentrations but the invention is not limited to these, but also lower concentrations may be used. Preferably the performic acid is used as an equilibrium solution comprising performic acid and hydrogen peroxide.

A treating chemical may be added to wastewater stream and/or wastewater sludge in at least one process location. It is also possible to add a treating chemical to wastewater stream and/or wastewater sludge in several different locations. This may include but is not limited to any location along the wastewater collection system where odors or corrosion are believed to occur. Preferably, a treating chemical is added one, two or more process locations that are close to locations where soluble/dissolved sulfides are supposed to exist or be generated. The treating chemical may be added to the headworks of the wastewater treatment plant to eliminate odors and corrosion caused by the change in flow dynamics, temperature, pH causing a release of $H_2S$ gas. Depending on conditions, the addition point may be at the influent or effluent of the primary or secondary treatment sections to reduce $H_2S$ levels for odor, corrosion or safety concerns. The treating chemical may also be added to any of the wastewater treatment plant solids applications or piping leading to or from any wastewater treatment solids applications such as anaerobic digesters, solids collection tanks and holding tanks. Dewatering equipment including, but not limited to filter presses, centrifuges and belts presses along with areas where solids may be collected, stored, conveyed, or moved from any one location to another. In an embodiment of the invention, the treating chemical may be added into a mixing sleeve in the wastewater sludge line. The treating chemical, such as percarboxylic acid would also apply to any solids that were being created or used for land application, reuse, fertilization, sterilization, composting or any other process whereby wastewater solids may be converted from one form to another.

In one preferred embodiment of the invention, a treating chemical comprising percarboxylic acid, preferably performic acid may be added to at least the influent of the wastewater treatment plant, since there might be observed significant amounts of dissolved sulfides.

According to an embodiment of the invention, performic acid to be used as a treating chemical may be prepared in the immediate vicinity of the process location where it is added to the wastewater or wastewater sludge. This guarantees the high chemical efficiency of the performic acid. Performic acid or other treating chemical according to the invention may be led to the process location through suitable connections and fed to a desired flow of wastewater or wastewater sludge by using suitable feeding means. The addition of the treating chemical may be continuous, i.e. the treating chemical is continuously added to the wastewater or wastewater sludge at least one process location during wastewater and sludge treatment. Alternatively, the treating chemical may be added to the wastewater or sludge under specified time period at predetermined time intervals.

According to an embodiment of the invention, the performic acid to be used as a treating chemical may be applied into the wastewater stream or wastewater sludge prior to addition of iron salts for dewatering.

The addition of the treating chemical may be fully automated. It is possible that there is at least one sensor which detects a concentration of dissolved sulfides in the wastewater or wastewater sludge stream, and the addition of the treating chemical may be automatically adjusted according to the information obtained from the at least one sensor. According to one embodiment a concentration of dissolved sulfides in the wastewater or wastewater sludge stream is detected, either continuously or at predetermined intervals, and the addition of the treating chemical is automatically adjusted according to the information obtained about the concentration. This kind of system improves the control of the added amount and guarantees the proper effective concentration of performic acid in the wastewater stream or wastewater sludge.

According to an embodiment of the invention a concentration of dissolved sulfides in the wastewater or wastewater sludge stream may be measured prior to the addition of the treating chemical and the addition of the treating chemical may be automatically adjusted according to the information obtained about the concentration. According to another embodiment of the invention, a concentration of dissolved sulfides in the wastewater or wastewater sludge stream may be measured at a point to which the wastewater stream is flowed after the addition of the treating chemical. Thus, the concentration may be measured prior to the addition point and/or after the addition point of the treating chemical. The control system for measuring a concentration of dissolved sulfides may comprise at least one sensor or it may comprise several sensors in different locations for providing information of the changes in dissolved sulfide concentrations. According to an embodiment of the invention, the method may further comprise modifying a rate of the addition of the treating chemical to the wastewater stream or wastewater sludge based on the measurement of the concentration of dissolved sulfides.

According to an embodiment of the invention, the treating chemical is added into the wastewater stream or wastewater sludge so as to bring the level of soluble sulfides, in particular $H_2S$, to a level of less than 5 ppm, in particular less than 2 ppm or even less than 1 ppm in the wastewater stream or wastewater sludge at the point where odor, corrosion or environmental issues are a concern. At 2 ppm or less, soluble sulfides are below the nuisance level. Therefore, in an embodiment of the present invention a treating chemical is added into the wastewater or wastewater sludge in an amount that reduces the sulfides below the nuisance level, i.e. below 2 ppm.

The amount of the treating chemical desired to dose into wastewater stream or wastewater sludge depends on the concentration of dissolved sulfides, but it may also depend on the volume of wastewater flow or a desired level of sulfides in the wastewater. The measurement of the concentration of dissolved sulfides and the dosing of the treating chemical on the basis on the measurements may be important since the amount of soluble sulfides may vary by time of day or time of year. In an embodiment of the present invention, the performic acid used as a treating chemical may be added in amount of 1-12 ppm, preferably 5-10 ppm calculated as an active concentration of PFA, since PFA has strong oxidizing properties and thus already small dosing amount of PFA as active concentration may achieve significant reduction of dissolved sulfides. A suitable amount may also be dependent on the active concentration of PFA. Due to strong oxidizing properties of PFA, it may also react rapidly with sulfides present in wastewater or wastewater sludge. Thus, it may not require long residence time in the wastewater or wastewater sludge and it may be added close to locations where dissolved sulfides are supposed to exist or be generated.

The method according to the invention may be used to treat any kind of wastewater streams and/or wastewater sludge. A treating chemical according to the invention is suitable for use in treating wastewater or wastewater sludge regardless of solid content and thus a method according to the invention is applicable for different kind of wastewater treatment processes. According to an embodiment of the invention the wastewater or wastewater sludge is treated in municipal wastewater collection or treatment application, municipal sludge collection or treatment application or industrial wastewater treatment applications. The wastewater stream refers in the present disclosure broadly to wastewater or wastewater sludge processed in wastewater treatment process regardless of the processing step or process flow of the wastewater treatment. These systems may range from vary simple processes to advanced treatment facilities designed to go from wastewater to drinking water quality. These can be used for public and private utilities as well as treatment facilities own by private industry.

EXPERIMENTAL

Example: Odor Control Laboratory Testing Utilizing

A sample from influent wastewater is grabbed at an influent channel of a municipal wastewater treatment plant. The samples are grabbed in a 1000 ml polypropylene bottle and filled completely to the top to prevent any volatilization of sulfide out of the sample.

A treating chemical formulation comprising performic acid (PFA) as an active odor controlling agent and all other reagents are prepared just prior to be used.

PFA 13.5% formulation is made of mixing stabilized formic acid with 50 weight-% hydrogen peroxide.

Separation of Soluble Sulfide From Insoluble Sulfide

The Standard Methods 4500-$S^{2-}$ for waters and wastewaters: Section B procedure is used to determine soluble sulfides with a DR2800 spectrophotometer for the Methylene Blue analysis. The procedure comprises the following steps:

1. In a 15 ml glass tube, place approximately 10 drops of 6N Sodium Hydroxide (NaOH).
2. Obtain 15 ml of sample from the middle of the water column in the sample bottle and place the pipetter in the glass tube and gently dispense the sample into the NaOH solution.
3. Add approximately 7 drops of Aluminum Chloride ($AlCl_3$) into the glass tube ensuring that the tube is full to the top at this point.
4. Mix the tube 4 times by inverting and let stand until the flocculant settles out yielding a fairly clear supernatant at the top of the glass tube.
5. Analyze immediately using DR2800 spectrophotometer for the Methylene Blue analysis.

PFA Tests to Determine Soluble Sulfides

Multiple samples were taken as describe above. For the test, 3 sample bottles are taken and labelled accordingly to: Control, 5 ppm PFA, and 10 ppm PFA. These test concentrations are within a recommended range of 1-10 ppm PFA active concentration. Samples are taken from the test bottles to establish a time 0 sulfide concentration within the bottles. No PFA was added to the test bottle labelled as control. To the 5 ppm PFA test bottle, 37 ppm of 13.5% PFA is added to the bottle. To the 10 ppm PFA test bottle, 74 ppm of 13.5% PFA is added to the bottle. All the bottles are gently mixed over 5 min. After 5 min, a 15 ml sample from each test bottle is collected as described standard method from mid-water column and placed gently in glass tubes respectively labeled as described above to separate the soluble sulfides from insoluble sulfides. After 10 min, another 15 ml sample is collected from the test bottles as collected from mid-water column and placed gently in glass tubes respectively labeled as described above.

Results

Test results are presented in Table 1. Time 0 samples taken just prior to the addition of PFA chemical. The time 0 Samples were taken to set the baseline of soluble sulfide in the samples collected.

TABLE 1

An amount of soluble sulfides (ppm) in different treatment times of the samples and different dosage amounts of PFA.

| PFA (as active conc.) | Treatment Time (min.) | | |
|---|---|---|---|
| | 0* | 5 | 10 |
| Control (0 ppm PFA) | 6.44 | 7.66 | 8.88** |
| 5 ppm PFA | 6.44 | 2.66 | 2.03 |
| 10 ppm PFA | 6.44 | 2.12 | 1.72 |

The increase in sulphide in the control could be a result of non-soluble sulfides being converted to soluble sulfides due to mixing and sampling.

As shown in the results, the addition of PFA reduces the soluble sulfides and so dissolved sulfides in wastewater treatment plant influent significantly with dosages from 5 ppm to 10 ppm. At 2 ppm or less, sulfide is below the nuisance level. Therefore, as PFA reduces the sulfide below the nuisance level, PFA may be used to control odor in wastewater and wastewater sludge. The 5 minutes and 10 minutes residence times are evaluated for this study as the PFA chemistry is very effective at short times, and the time required to neutralize sulfide would occur very quickly. The results of this study demonstrate that greater than 90% reduction of the soluble sulfide concentration occurred within 5 minutes as compared to the untreated control which demonstrated no loss of soluble sulfide over the 5 minutes residence time or the 10 minutes residence time. This study also demonstrates that PFA is capable of removing soluble sulfide from wastewaters with suspended solids proved to reduce soluble sulfides further in contrast to the control with increased sulfide generation.

The invention claimed is:

1. A method for treating a wastewater and/or a wastewater sludge stream comprising dissolved sulfides, said method comprising:
    measuring a concentration of the dissolved sulfides in the wastewater and/or the wastewater sludge stream;
    adding performic acid as a treating chemical to the wastewater and/or the wastewater sludge stream as an odor controlling agent and/or a corrosion controlling agent in an amount of 1-12 ppm calculated as an active concentration of performic acid, wherein the active concentration of the performic acid is 8%-14% calculated as weight to volume of the treating chemical; and
    adjusting the amount of the treating chemical based on the concentration of the dissolved sulfides measured;
    wherein adding the treating chemical decreases the concentration of the dissolved sulfides within 5-10 minutes to below 5 ppm, and wherein said treating chemical is added to a headworks of a wastewater treatment plant, an influent of the wastewater treatment plant and/or a wastewater treatment plant solids applications or a piping leading to or from the wastewater treatment plant solids applications.

2. The method according to claim 1, wherein the active concentration of the performic acid is at least 9% calculated as weight to volume of the treating chemical.

3. The method according to claim 1, wherein the wastewater and/or the wastewater sludge stream is a stream in a municipal wastewater collection or treatment application, in a municipal sludge collection or treatment application, or in an industrial wastewater application.

4. The method according to claim 1, wherein the concentration of the dissolved sulfides in the wastewater and/or the wastewater sludge stream is measured at a point, to which the wastewater and/or the wastewater sludge stream is flown after adding the treating chemical.

5. The method according to claim 1, wherein adjusting the amount of the treating chemical is conducted by modifying a rate of adding the treating chemical to the wastewater and/or the wastewater sludge stream based on the concentration of the dissolved sulfides measured.

6. The method according to claim 1, wherein the treating chemical is added continuously to the wastewater and/or the wastewater sludge stream in at least one process location.

7. The method according to claim 2, wherein the active concentration of the performic acid is at least 10% calculated as weight to volume of the treating chemical.

8. The method according to claim 1, wherein adding the treating chemical decreases the concentration of the dissolved sulfides to less than 2 ppm within 5-10 minutes in the wastewater and/or the wastewater sludge stream.

9. The method according to claim 8, wherein adding the treating chemical decreases the concentration of the dissolved sulfides to less than 1 ppm within 5-10 minutes in the wastewater and/or the wastewater sludge stream.

* * * * *